(12) United States Patent
Chang

(10) Patent No.: US 9,186,736 B1
(45) Date of Patent: Nov. 17, 2015

(54) COLLAPSIBLE STAND FOR TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 14/280,615

(22) Filed: May 18, 2014

(51) Int. Cl.
*B62B 1/00* (2006.01)
*B23D 57/00* (2006.01)
*B25H 1/04* (2006.01)
*B62B 1/10* (2006.01)
*B62B 1/26* (2006.01)
*B62B 5/06* (2006.01)

(52) U.S. Cl.
CPC .............. *B23D 57/0092* (2013.01); *B25H 1/04* (2013.01); *B62B 1/10* (2013.01); *B62B 1/26* (2013.01); *B62B 5/06* (2013.01)

(58) Field of Classification Search
CPC ........ B25H 1/04; B23D 57/0092; B62B 1/10; B62B 1/26; B62B 5/06
See application file for complete search history.

(56) References Cited

U.S. PATENT DOCUMENTS

| | | | | |
|---|---|---|---|---|
| 3,498,628 | A * | 3/1970 | Ferneau et al. | 280/641 |
| 4,998,742 | A * | 3/1991 | Maynard | 280/35 |
| 5,087,013 | A * | 2/1992 | Gress et al. | 248/676 |
| 5,482,303 | A * | 1/1996 | Meloy | 280/43.17 |
| 6,578,856 | B2 * | 6/2003 | Kahle | 280/30 |
| 6,899,306 | B1 * | 5/2005 | Huang | 248/150 |
| 7,059,616 | B2 * | 6/2006 | Wu | 280/47.24 |
| D527,200 | S * | 8/2006 | Wu | D6/684 |
| 7,131,364 | B2 * | 11/2006 | Brazell | 83/477.2 |
| 7,222,865 | B2 * | 5/2007 | Chen et al. | 280/30 |
| 7,255,355 | B2 * | 8/2007 | Chisholm et al. | 280/30 |
| 7,418,907 | B2 * | 9/2008 | Haimoff | 108/91 |
| 7,487,947 | B2 * | 2/2009 | Liu et al. | 248/439 |
| 7,494,149 | B2 * | 2/2009 | Liu et al. | 280/639 |
| 7,681,893 | B2 * | 3/2010 | Liu et al. | 280/35 |
| 7,882,870 | B2 * | 2/2011 | Lee | 144/286.1 |
| 8,096,519 | B2 * | 1/2012 | Tam et al. | 248/434 |
| 8,313,076 | B2 * | 11/2012 | Tam et al. | 248/434 |
| 8,376,307 | B2 * | 2/2013 | Frolov | 248/431 |
| 8,464,994 | B2 * | 6/2013 | Chiu | 248/439 |
| 8,517,413 | B2 * | 8/2013 | Chen | 280/651 |
| 8,523,123 | B2 * | 9/2013 | Chiu | 248/166 |
| 8,579,320 | B2 * | 11/2013 | Chiu | 280/652 |
| 8,602,378 | B2 * | 12/2013 | Tam et al. | 248/434 |
| 8,910,970 | B2 * | 12/2014 | Chen | 280/652 |
| 2006/0145045 | A1 * | 7/2006 | Chisholm et al. | 248/439 |
| 2007/0012826 | A1 * | 1/2007 | Liu et al. | 248/129 |
| 2008/0067786 | A1 * | 3/2008 | Liu et al. | 280/639 |
| 2010/0229767 | A1 * | 9/2010 | Chiu | 108/115 |
| 2012/0175861 | A1 * | 7/2012 | Tam et al. | 280/652 |
| 2012/0217727 | A1 * | 8/2012 | Lee | 280/652 |
| 2012/0318940 | A1 * | 12/2012 | Chen | 248/164 |
| 2013/0075990 | A1 * | 3/2013 | Tam et al. | 280/35 |
| 2015/0108418 | A1 * | 4/2015 | Chang | 254/418 |

* cited by examiner

*Primary Examiner* — Hau Phan
*Assistant Examiner* — Jacob Meyer

(57) ABSTRACT

A stand for a table saw including a table assembly and a base assembly secured under the table assembly is provided. The stand includes a leg and handle unit including two parallel leg elements, two handles at one ends of the leg elements respectively, two side rails each having one end connected to both the handle and the leg element, and a U-shaped support element at the other ends of the leg elements, vertical metal tubes each provided at an end of the side rail joining both the handle and the leg element, top of each metal tube is secured to a bottom of the table assembly; a U-shaped, tubular upper support pivotably secured to the side rail, the upper support including two opposite lateral projections; and a leg unit including two parallel leg members, and two wheels rotatably mounted at one ends of the leg members respectively.

8 Claims, 13 Drawing Sheets

COLLAPSIBLE STAND FOR TABLE SAW

BACKGROUND OF THE INVENTION

1. Field of the Invention

The invention relates to table saws and more particularly to a collapsible, wheeled stand for a table saw.

2. Description of Related Art

Prior art teaches a variety of stands for supporting benchtop power tools. The prior art stands include various features for enhancing portability and mobility. For example, U.S. Pat. No. 6,578,856 to Kahle, entitled "Collapsible portable saw stand", comprises a lateral support structure, such as a platform for holding a tool; a secondary support frame having a first end pivotally attached to a first end the lateral support structure; and a main support frame pivotally attached to the secondary support frame, wherein the main support frame comprises a handle at a first end for transporting the stand in its collapsed position, and wherein the handle comprises an out feed support for the table saw when the stand is in its set up position.

A drawback of the stand of the U.S. Pat. No. 6,578,856 is that sturdiness is limited by the size of the legs of the stand in order to facilitate compactness of the stand.

Notwithstanding the prior art, the invention is neither taught nor rendered obvious thereby.

SUMMARY OF THE INVENTION

It is therefore one object of the invention to provide a stand for a table saw including a table assembly and a base assembly secured to an underside of the table assembly, the stand comprising a leg and handle unit including two parallel leg elements, two handles at one ends of the leg elements respectively, two side rails each having one end connected to both the handle and the leg element, and a U-shaped support element at the other ends of the leg elements, a plurality of vertical metal tubes each provided at an end of the side rail joining both the handle and the leg element, a top of each metal tube is secured to a bottom of the table assembly wherein the leg element includes a laterally inward extending protrusion; an upper support being U-shaped tubular and pivotably secured to the side rail, the upper support including two opposite lateral projections; and a leg unit including two parallel leg members, and two wheels rotatably mounted at one ends of the leg members respectively; wherein the other ends of the leg members are pivotably secured to the upper support and upper portions of the leg members are pivotably secured to the leg and handle unit.

The above and other objects, features and advantages of the invention will become apparent from the following detailed description taken with the accompanying drawings.

DETAILED DESCRIPTION OF THE INVENTION

Figure 1:
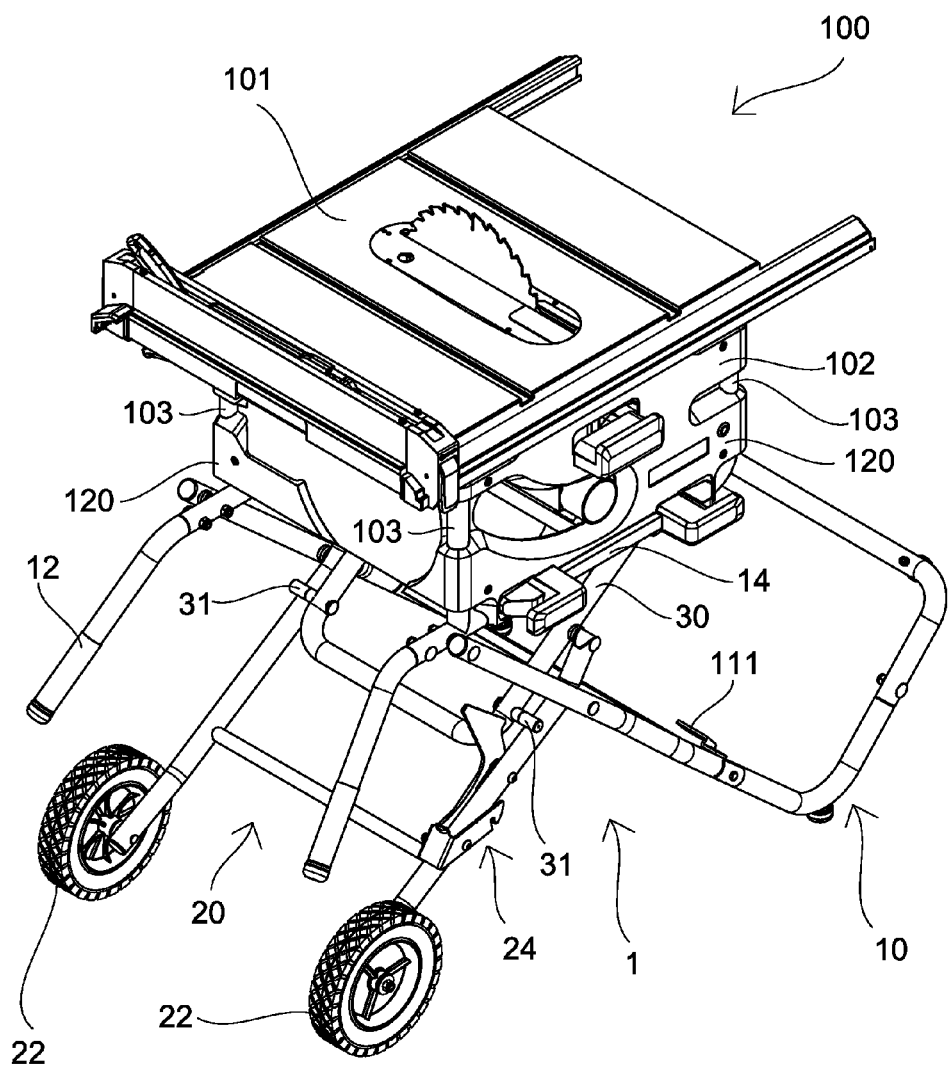
FIG. 1 is a perspective view of a mobile table saw according to a first preferred embodiment of the invention.
Figure 2:
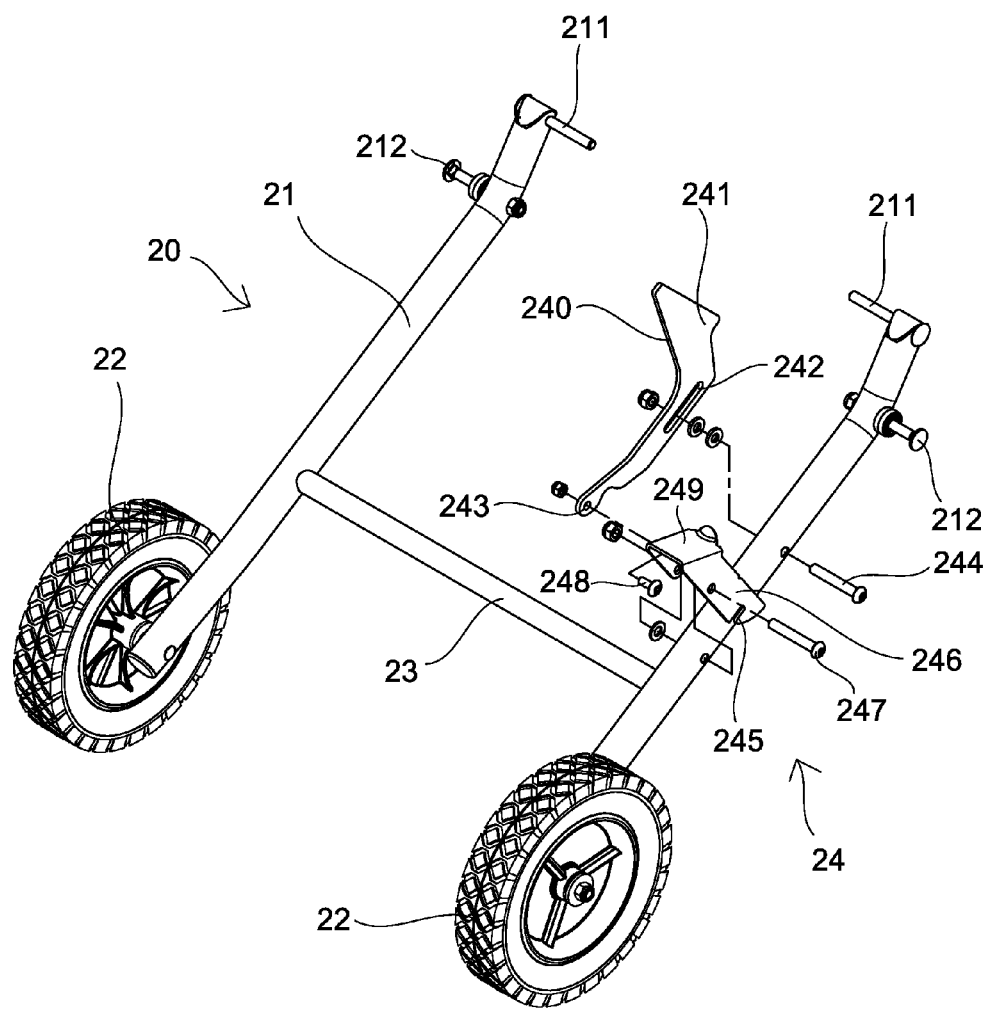
FIG. 2 is an exploded perspective view of the leg unit shown in FIG. 1.
Figure 3:
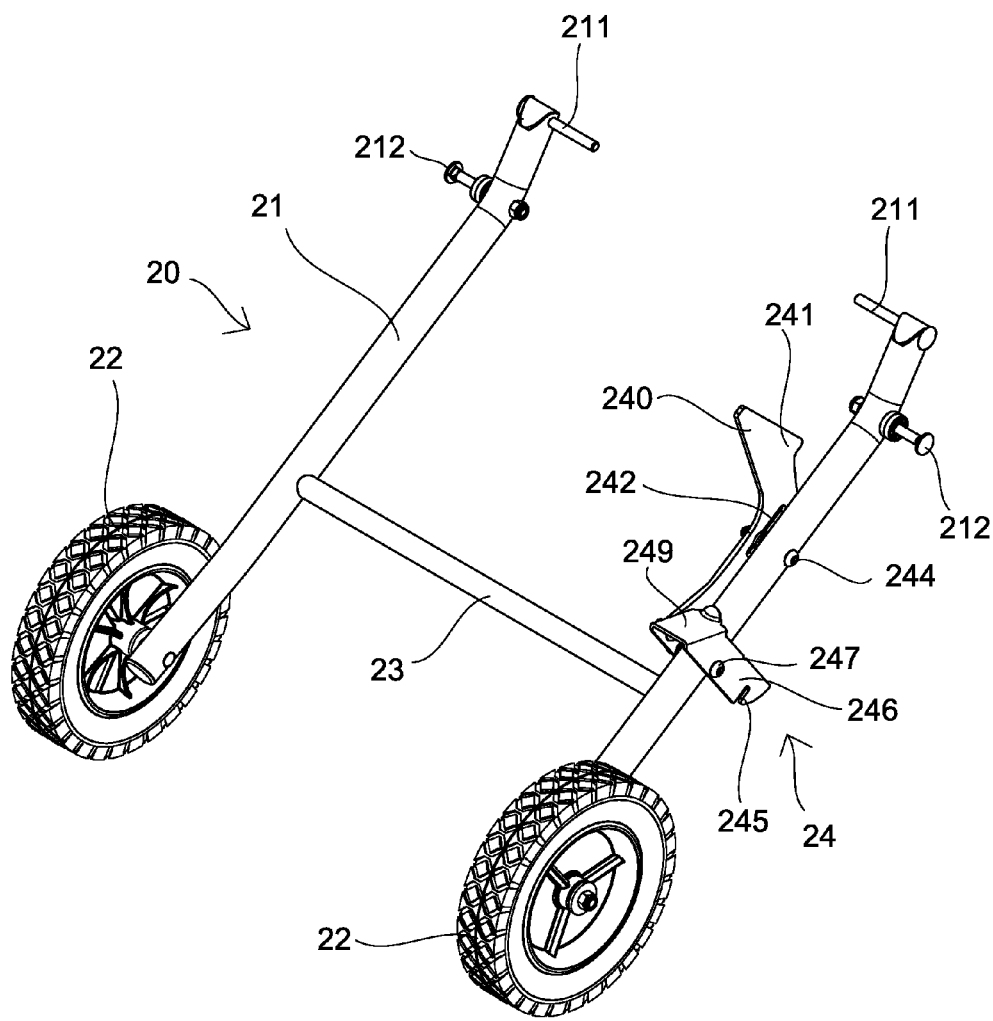
FIG. 3 is a perspective view of the leg unit shown in FIG. 1.

Referring to FIGS. 1 to 12, a mobile table saw 100 in accordance with a first preferred embodiment of the invention comprises a table assembly 101, a base assembly 102 secured to an underside of the table assembly 101, and a scissors-type foldable stand 1.

The mobile table saw 100 further comprise an elongated slot 110 on top the table assembly 101, and a circular saw blade 112 protruding the slot 110. The mobile table saw 100 further comprise an angle or bevel adjustment mechanism 113 on a rear surface of the base assembly 102 for adjusting an angle with respect to the table assembly 101, and a height adjustment mechanism 114 for adjusting depth of cut by the mobile table saw 100. The circular saw blade 112, the angle or bevel adjustment mechanism 113, and the height adjustment mechanism 114 are known devices. Thus, a detailed description thereof is omitted herein for the sake of brevity. Moreover, there are provided a projecting plate 120 on each of one side, the other side, and a rear surface of base assembly 102 for receipt of tools such as fences, cutting tools, or the like.

The stand 1 is the subject of the invention and comprises the following components as discussed in detail below.

A leg and handle unit 10 includes two parallel leg elements 11, two handles 12 at one ends of the leg elements 11 respectively, a U-shaped support element 13 at the other ends of the leg elements 11, and two side rails 14 each having one end connected to both the handle 12 and the leg element 11. The leg element 11 includes a laterally inward extending protrusion 111.

An upper support 30 is a U-shaped tubular member and is pivotably secured to the side rails 14. The upper support 30 includes two opposite lateral projections 31.

A leg unit 20 includes two parallel leg members 21, two wheels 22 rotatably mounted at one ends of the leg members 21 respectively, a crossbar 23 interconnecting lower portions of the leg members 21, and a lock mechanism 24 mounted on one leg member 21 and adjacent to the crossbar 23. The other ends of the leg members 21 are pivotably secured to the upper support 30 by means of two pivots 211. Upper portions of the leg members 21 are pivotably secured to the leg and handle unit 10 by means of two pivots 212. Thus, each projection 31 of the upper support 30 and the leg element 11 of the leg unit 20 are releasably engaged so as to limit a pivotal angle of the leg and handle 12 unit 10 relative to the leg unit 20 without additional fasteners 105.

The lock assembly 24 includes a link member 240 having a hook 241 at one end, an elongated slot 242 proximate to the hook 241, and a hole 243 at the other end; a pin 244 driven through the leg member 21 and the slot 242 to moveably secure the link member 240 to the leg unit 20; a bifurcation member 246 pivotably secured onto the leg member 21 by means of a pivot pin 247; and a pivot member 248 driven through one side of the bifurcation member 246 and the hole 243 to pivotably secure the bifurcation member 246 and the link member 240 together. Further, the bifurcation member 246 includes a trigger 249, and two plate portions extending downward from the trigger 249 so that the bifurcation member 246 has an n-shaped section. A slit 245 is formed on one of the plate portions.

Figure 4:
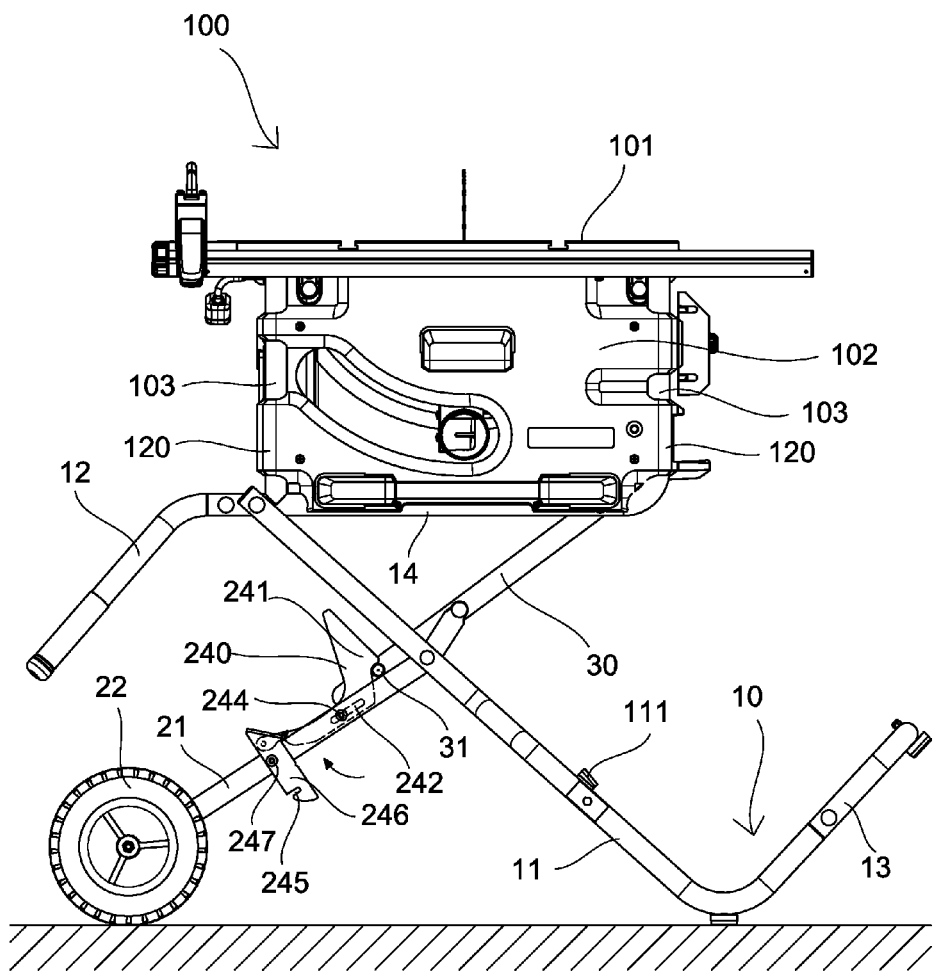
FIG. 4 is a rear view of the mobile table saw showing the lock mechanism being manipulated to unlock the stand prior to folding and wheeling the mobile table saw.
Figure 4A:
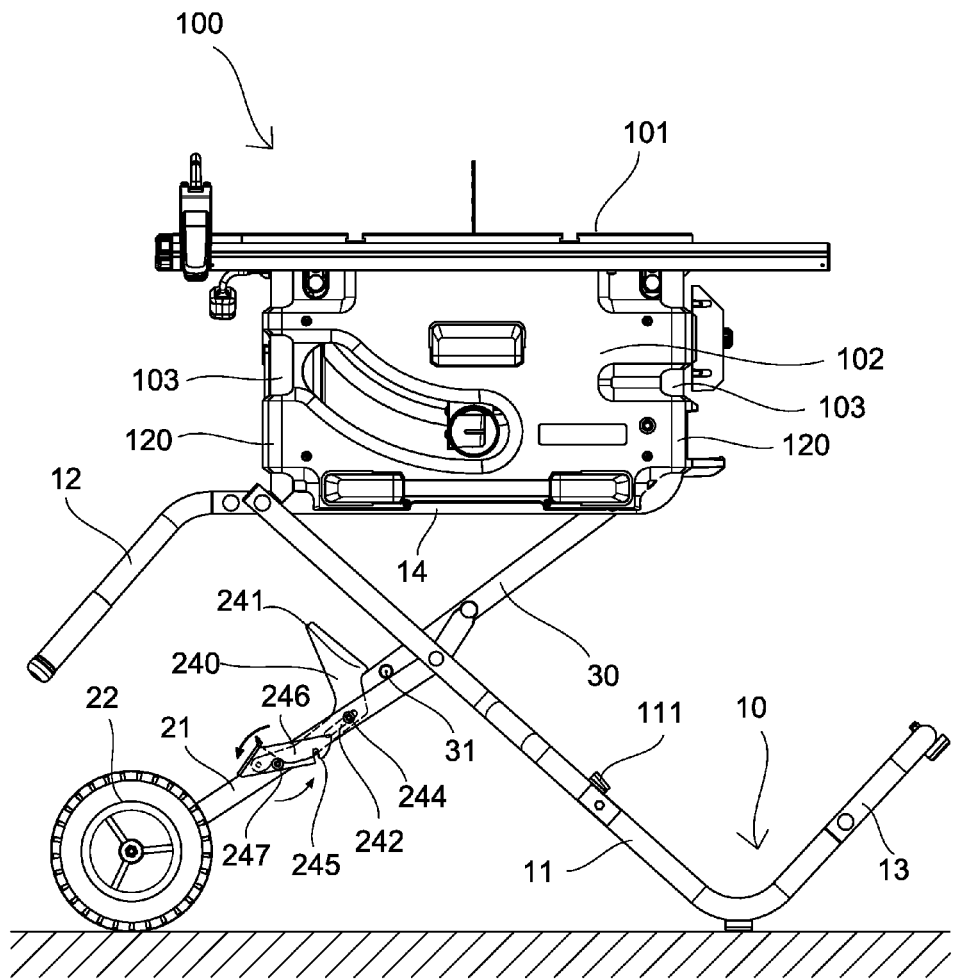
FIG. 4A is a view similar to FIG. 4 showing a next folding operation by clockwise turning the bifurcation member.
Figure 5:
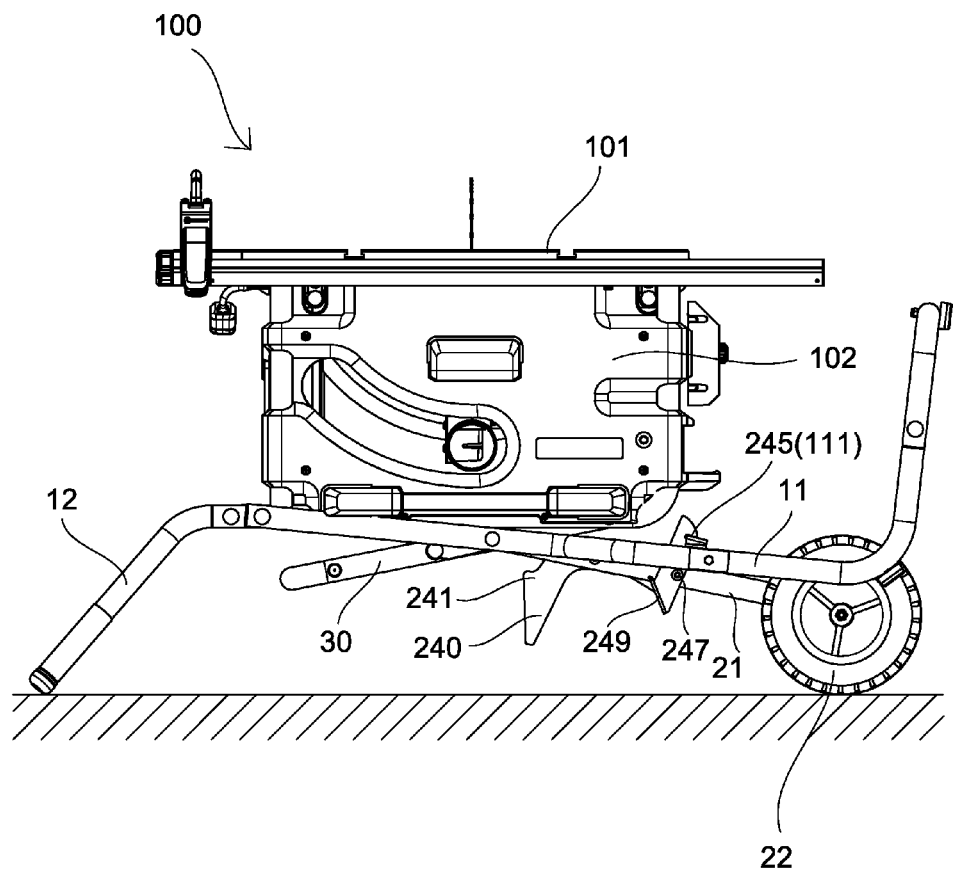
FIG. 5 is a view similar to FIG. 4A showing the mobile table saw being folded and rested upon an underlying support surface.
Figure 6:
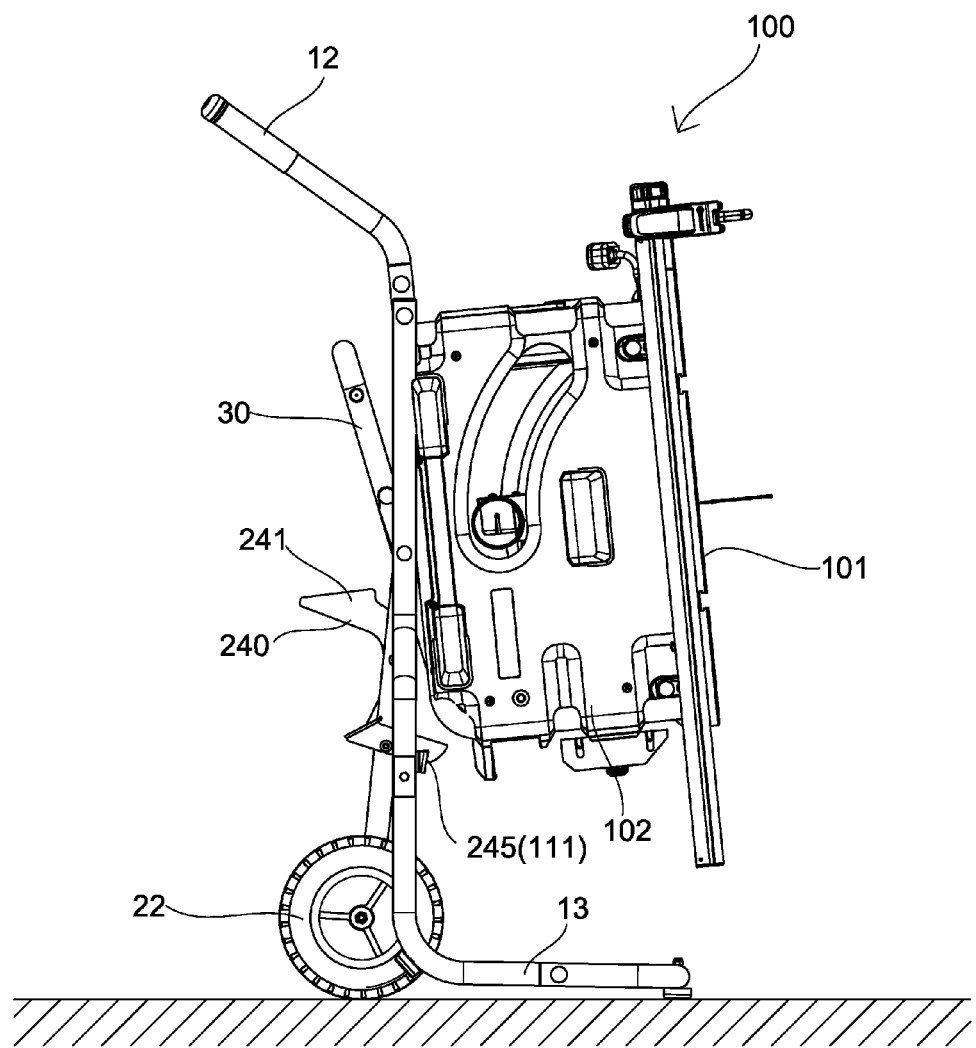
FIG. 6 is a view similar to FIG. 5 showing an erected position of the mobile table saw.
Figure 7:
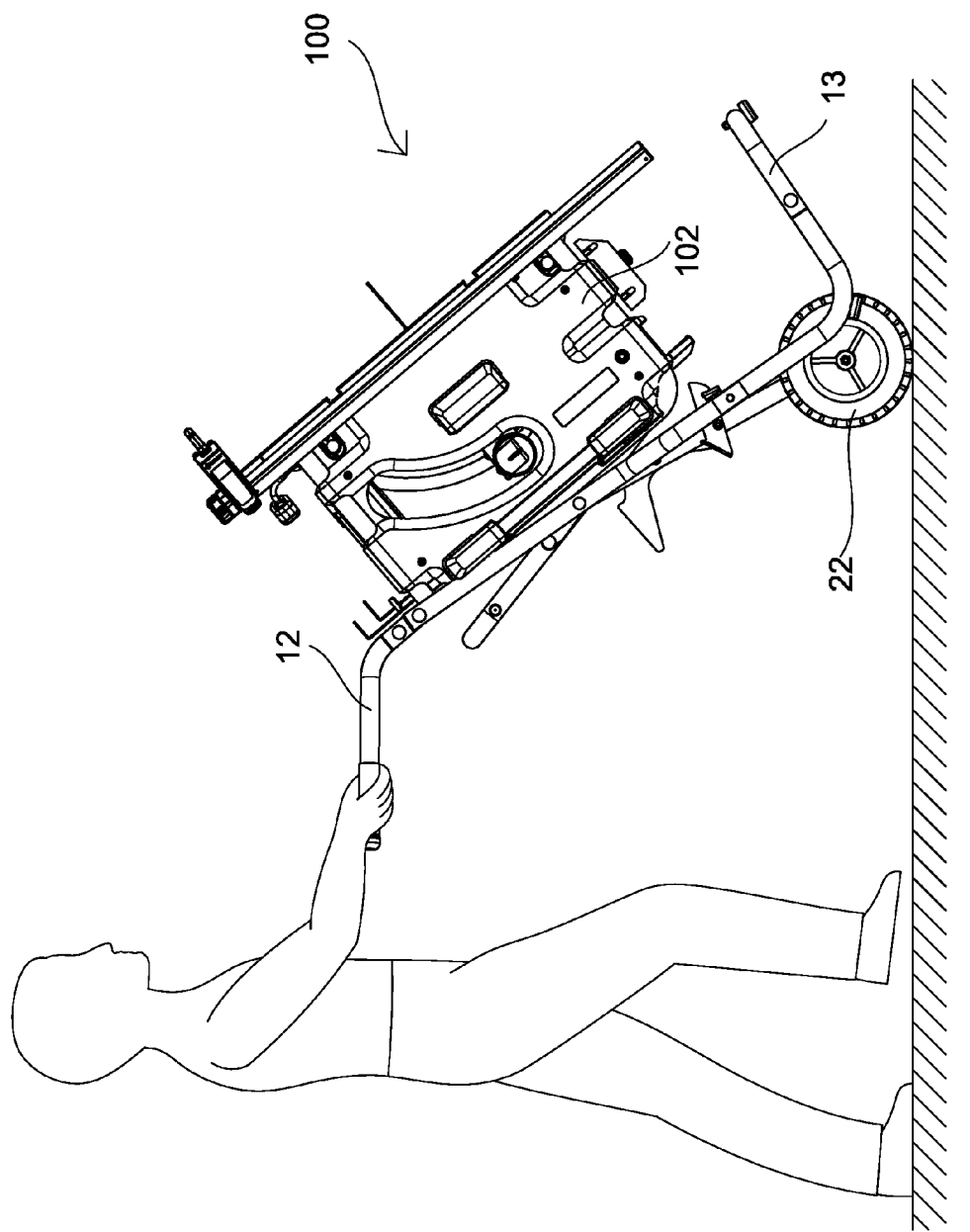
FIG. 7 is a rear view showing the folded mobile table saw being pushed by a person by wheeling on the underlying support surface.
Figure 8:
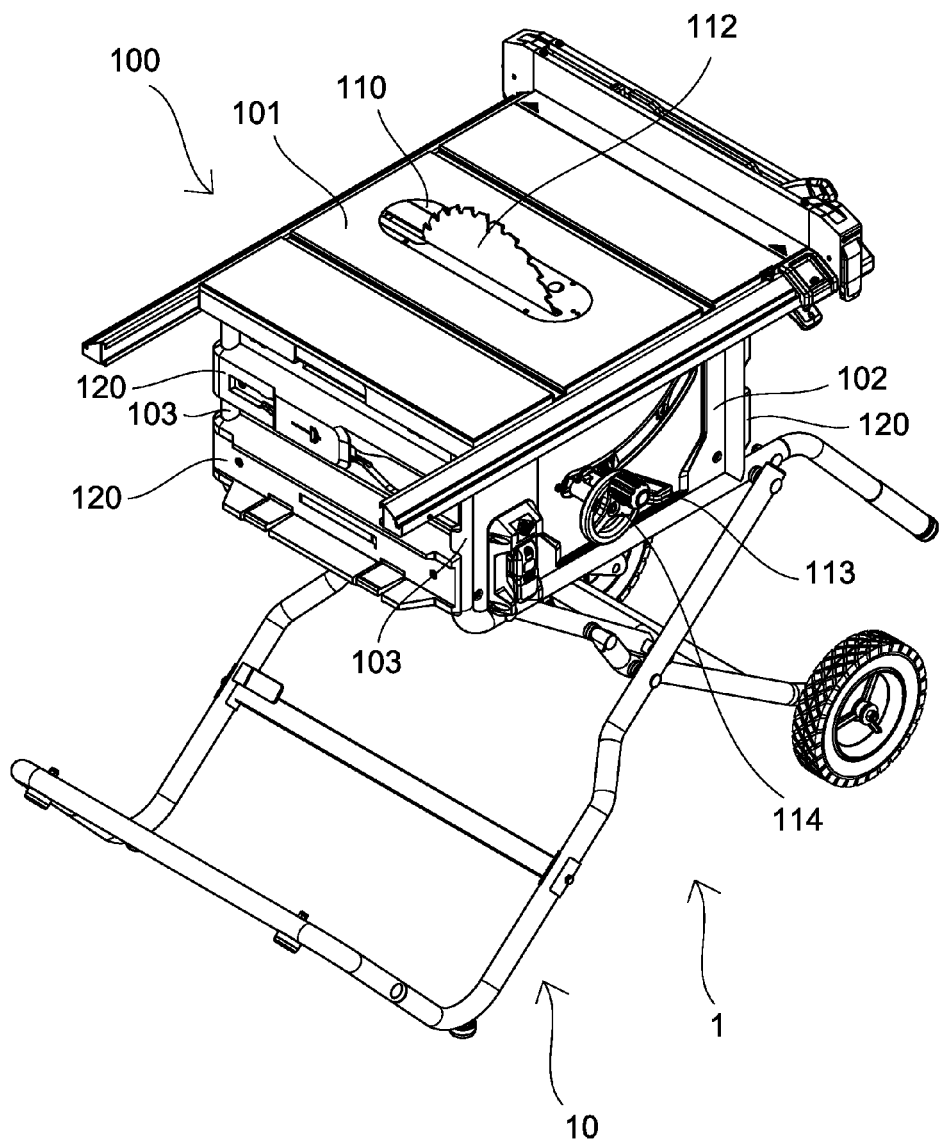
FIG. 8 is another perspective view of the mobile table saw of the invention.
Figure 9:
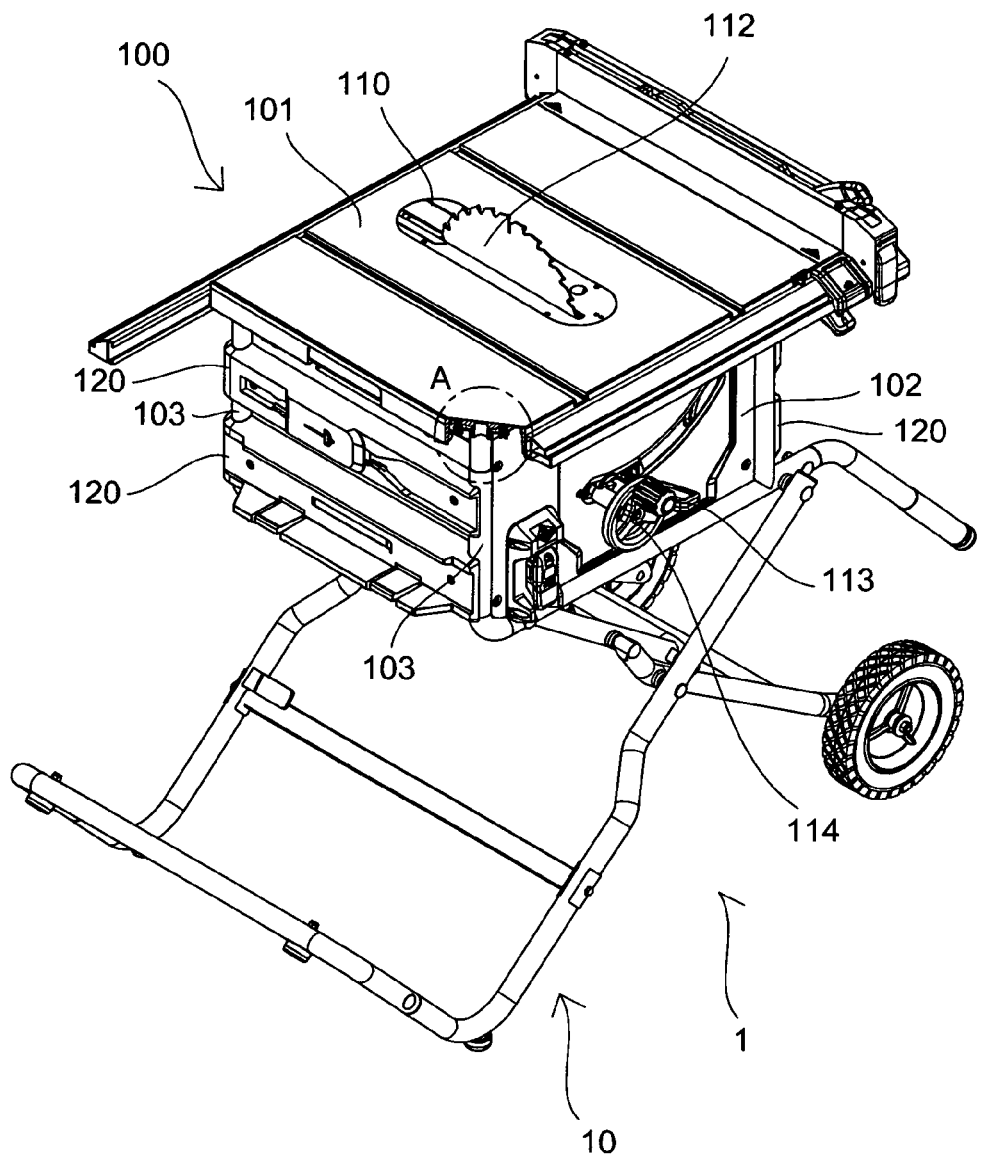
FIG. 9 is a view similar to FIG. 8 showing a corner of the table assembly being cut.
Figure 10:
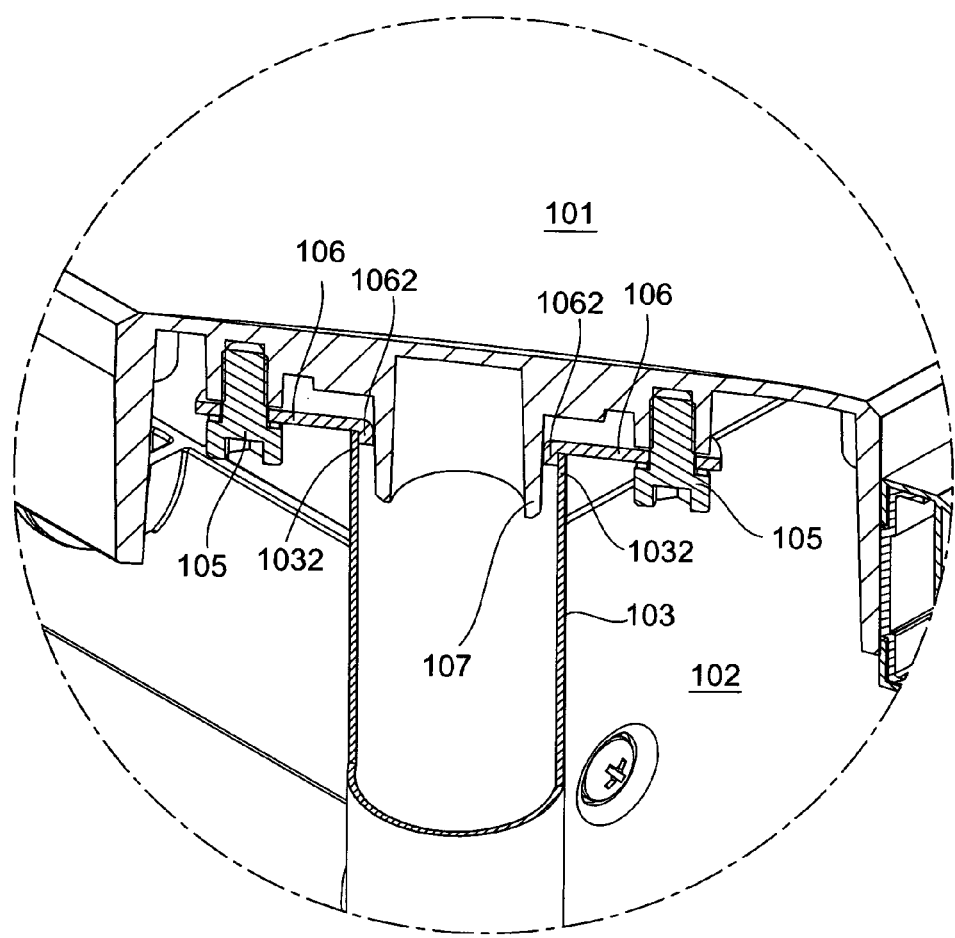
FIG. 10 is a detailed view of the area in circle A of FIG. 9.
Figure 11:
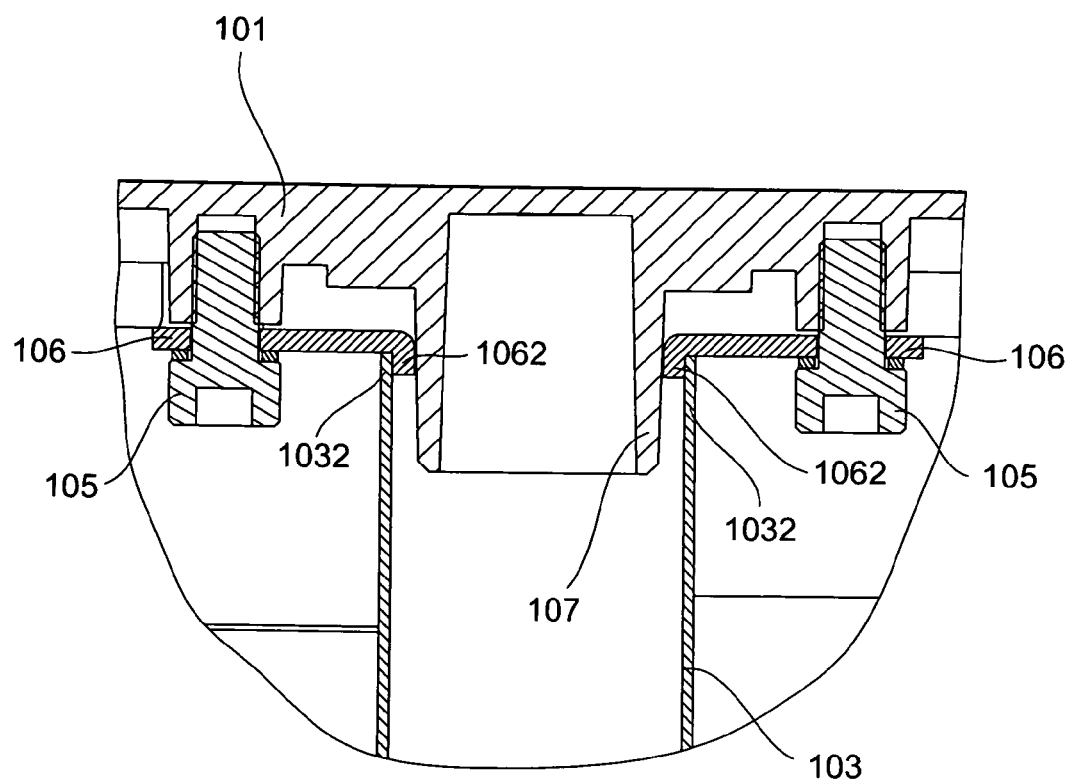
FIG. 11 is an enlarged fragmentary view of FIG. 10.
Figure 12:
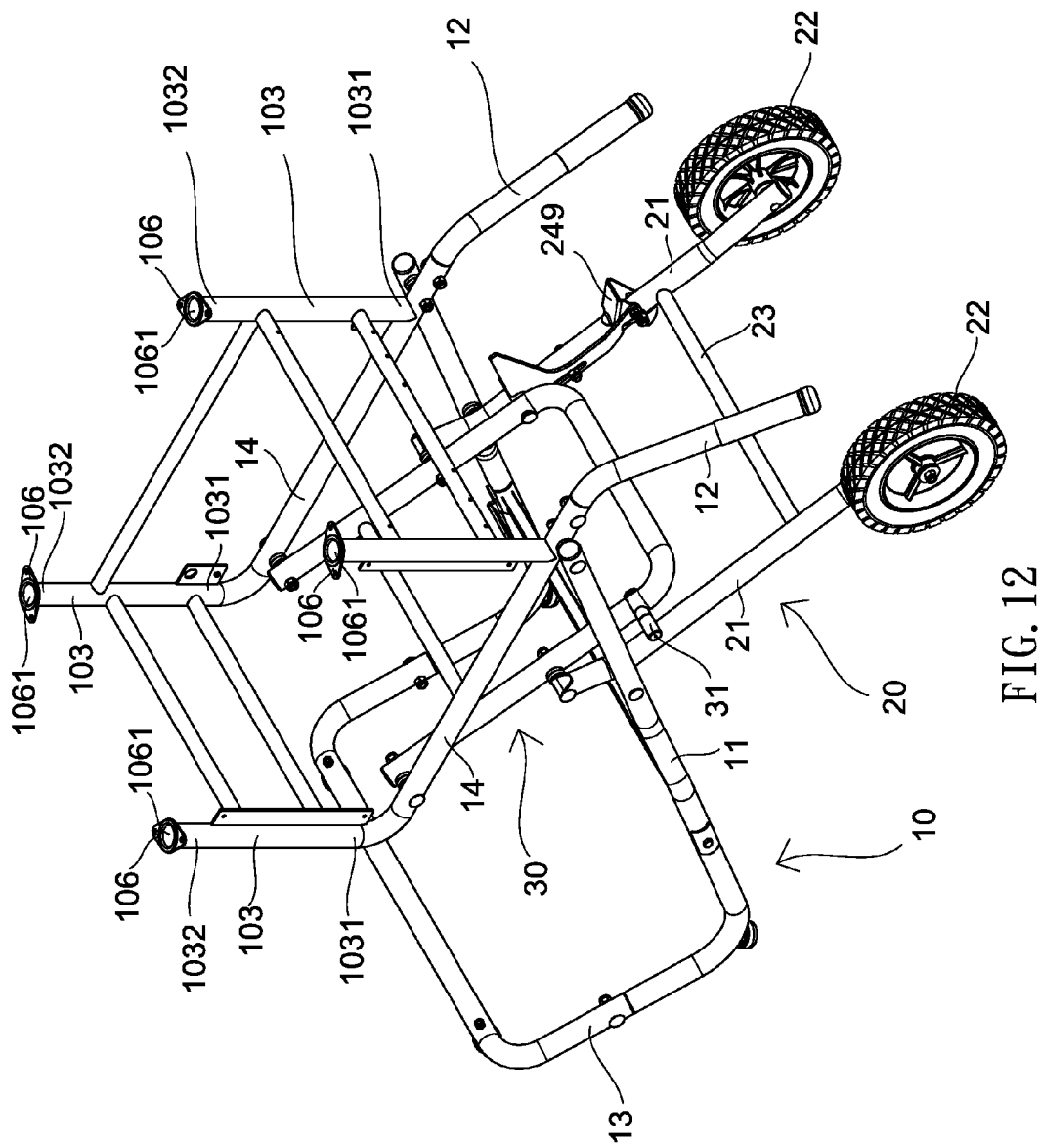
FIG. 12 is a perspective view of the stand with the mobile table saw removed.

Operations of the invention are described in detail below. In a ready to use position or locked position as shown in FIG. 1, the hook 241 is disengaged from the projection 31 and the pin 244 is disposed at one end of the slot 242. A user may unfold the stand 1 by clockwise turning the leg unit 20. Also, the link member 240 moves toward the pivots 212 to displace the pin 244 until the hook 241 is put on the projection 31 and the pin 244 is disposed proximate to the other end of the slot 242 (see FIG. 4). As such, the stand 1 is erected and locked. Next, the user may fold the stand 1 by pushing the trigger 249 of the bifurcation member 246. And in turn, an inner surface of the trigger 249 presses down an end of the link member 240 (i.e., end of the hole 243 of the link member 240). Also, the link member 240 disengages from the pivots 212 to displace the pin 244 until the hook 241 clears the projection 31 and the pin 244 is disposed proximate to the end of the slot 242 (see FIG. 4A). Thereafter, counterclockwise pivot the leg unit 20 relative to the leg and handle unit 10 by pressing down the trigger 249 of the bifurcation member 246 until the wheels 22 are disposed at joining portions of the support element 13 and the leg elements 11. Further, the slit 245 of the bifurcation member 246 is put on the projection 111 of the leg elements 11. Furthermore, the table saw 100 is erected on the ground with the help of the support element 13 and the wheels (see FIG. 6). As such, the stand 1 is folded and locked. Thereafter, the user may dispose the table saw 100 horizontally by pushing down the handles 12 (see FIG. 5), and push the table saw 100 by wheeling on the underlying support surface (see FIG. 7).

Referring to FIGS. 8 to 12, the mobile table saw 100 comprises the scissors-type foldable stand 1, the table assembly 101, and the base assembly 102 secured to an underside of the table assembly 101 by means of a fastening mechanism at each of four corners of the table assembly 101 as discussed in detail below.

A pressing ring 106 includes an opening 1061 and a bottom flange 1062 around the opening 1061.

Four vertical metal tubes 103 each is provided at an end of the side rail 14 joining the handle 12 and the leg element 11. The handles 12, the side rails 14, and the metal tube 103 are formed integrally. The metal tube 103 is extended upward from a corner of the base assembly 102, the metal tube 103 having a first end 1031 spaced from the side rail 14 and a second end 1032 wherein the second end 1032 has an inner diameter greater than or equal to an outer diameter of the flange 1062 of the pressing ring 106, the second end 1032 urges against a bottom of the pressing ring 106, the second end 1032 is connected to the flange 1062 of the pressing ring 106, and the metal tube 103 is combined with the pressing ring 106 without detachment. Two fasteners 105 are driven through the pressing ring 106 into the table assembly 101 to urge the pressing ring 106 against the underside of the table assembly 101. Further, a downward extending tube 107 is formed on each of four corners of the bottom of the table assembly 101. A diameter of the tube 107 is less than that of the opening 1061 of the pressing ring 106. The tube 107 is concentric with respect to the pressing ring 106 and disposed therein.

While the invention has been described in terms of preferred embodiments, those skilled in the art will recognize that the invention can be practiced with modifications within the spirit and scope of the appended claims.

What is claimed is:

1. A stand for a table saw including a table assembly and a base assembly secured to an underside of the table assembly, the stand comprising:
   a leg and handle unit including two parallel leg elements, two handles at first ends of the leg elements respectively, two side rails each having one end connected to both the handle and the leg element, and a U-shaped support element at the other ends of the leg elements, a plurality of vertical metal tubes each provided at an end of the side rail joining both the handle and the leg element, a top of each metal tube is secured to a bottom of the table assembly wherein the leg element includes a laterally inward extending protrusion;
   an upper support being U-shaped tubular and pivotably secured to the side rail, the upper support including two opposite lateral projections; and
   a leg unit including two parallel leg members, and two wheels rotatably mounted at first ends of the leg members respectively;
   wherein the other ends of the leg members are pivotably secured to the upper support and upper portions of the leg members are pivotably secured to the leg and handle unit;
   wherein each projection of the upper support and the leg member of the leg unit are releasably engaged so as to limit a pivotal angle of the leg and handle unit relative to the leg unit.

2. The stand of claim 1, further comprising a projecting plate on each of one side, the other side, and a rear surface of the base assembly for receipt of tools including fences and cutting tools.

3. The stand of claim 1, wherein the other ends of the leg members are pivotably secured to the upper support by means of two pivots, and upper portions of the leg members are pivotably secured to the leg and handle unit by means of two pivots.

4. The stand of claim 1, further comprising four fastening mechanisms disposed at four corners of the table assembly respectively, the fastening mechanism comprising:
   a pressing ring including an opening and a bottom flange around the opening;
   a metal tube extending upward from a corner of the base assembly, the metal tube having a first end spaced from the side rail and a second end wherein the second end has an inner diameter greater than or equal to an outer diameter of the flange of the pressing ring, the second end urges against a bottom of the pressing ring, the second end is connected to the flange of the pressing ring, and the metal tube is combined with the pressing ring without detachment; and
   a plurality of fasteners each driven through the pressing ring into the table assembly to urge the pressing ring against the underside of the table assembly.

5. The stand of claim 4, further comprising a downward extending tube on each of four corners of the bottom of the table assembly, wherein a diameter of the downward extending tube is less than that of the opening of the pressing ring, and the tube is concentric with respect to the pressing ring and disposed therein.

6. The stand of claim 1, further comprising a lock mechanism mounted on one leg member;

wherein the lock assembly includes a link member having a hook at one end and an elongated slot proximate to the hook; a pin driven through the leg member and the slot to moveably secure the link member to the leg unit; and a bifurcation member pivotably secured to both the link member and the leg member by means of a pivot pin;

wherein in a locked position the hook is disengaged from one of the projections and the pin is disposed at one end of the slot;

wherein a pushing of the bifurcation member further away from the wheels displaces the pin until the hook is put on one of the projections and the pin is disposed proximate to the other end of the slot, thereby unlocking the stand; and wherein a pivotal movement of the leg unit relative to the leg and handle unit by pressing down the bifurcation member disposes the wheels at joining portions of the support element and the leg elements, thereby folding the stand.

7. The stand of claim 6, wherein the bifurcation member includes a trigger, two plate portions extending downward from the trigger so that the bifurcation member has an n-shaped section, and a slit formed on one of the plate portions, the slit of the bifurcation member being configured to be put on the projection of the leg element in a folded, locked position of the stand.

8. The stand of claim 7, further comprising a hole at the other end of the link member, and a pivot member driven through one side of the bifurcation member and the hole to pivotably secure the bifurcation member and the link member together.

* * * * *